United States Patent
Mohanty et al.

(10) Patent No.: US 11,478,771 B2
(45) Date of Patent: Oct. 25, 2022

(54) FREE RADICAL GENERATOR AND METHODS OF USE

(71) Applicant: SOMNIO GLOBAL HOLDINGS, LLC, Novi, MI (US)

(72) Inventors: Pravansu S. Mohanty, Canton, MI (US); Vigneswaran Appia, Novi, MI (US); Tejasvi Chunduri, Ann Arbor, MI (US); Volodymyr Golota, Novi, MI (US); Raj Ugapathy, Novi, MI (US)

(73) Assignee: Somnio Global Holdings, LLC, Farmington Hills, MI (US)

( * ) Notice: Subject to any disclaimer, the term of this patent is extended or adjusted under 35 U.S.C. 154(b) by 79 days.

(21) Appl. No.: 16/643,132

(22) PCT Filed: Sep. 4, 2018

(86) PCT No.: PCT/US2018/049331
§ 371 (c)(1),
(2) Date: Feb. 28, 2020

(87) PCT Pub. No.: WO2019/046843
PCT Pub. Date: Mar. 7, 2019

(65) Prior Publication Data
US 2020/0391173 A1    Dec. 17, 2020

Related U.S. Application Data

(60) Provisional application No. 62/553,546, filed on Sep. 1, 2017.

(51) Int. Cl.
*B01J 19/08* (2006.01)
*B01D 53/06* (2006.01)
(Continued)

(52) U.S. Cl.
CPC ............ *B01J 19/088* (2013.01); *B01D 53/06* (2013.01); *B01D 53/261* (2013.01); *B01D 53/28* (2013.01);
(Continued)

(58) Field of Classification Search
CPC .................. B01J 19/088; B01J 19/0066; B01J 2219/0869; B01J 2219/0871;
(Continued)

(56) References Cited

U.S. PATENT DOCUMENTS 3,558,286 A * 1/1971 Gourdine ................ B03C 3/019
422/169
6,386,751 B1   5/2002 Wootan et al.
(Continued)

FOREIGN PATENT DOCUMENTS

CN   103537245 A   1/2014
CN   105772272 A   7/2016
(Continued)

OTHER PUBLICATIONS

European Supplemental Search Report for European patent application No. 18850050.8, dated Mar. 31, 2021.
(Continued)

*Primary Examiner* — Xiuyu Tai
(74) *Attorney, Agent, or Firm* — Dinsmore & Shohl LLP; Weston R. Gould

(57) ABSTRACT

Devices suitable for use in an advanced oxidation method for organic and inorganic pollutants deploying OH* radicals and ozone is disclosed. Optionally, a first discharge device, providing OH* radicals and second discharge device providing ozone, are combined to provide desirable chemical and biocidal characteristics. Further, efficient mixing systems for transferring the radicals to the target fluid are disclosed.

16 Claims, 14 Drawing Sheets

(51) Int. Cl.
*B01D 53/26* (2006.01)
*B01D 53/28* (2006.01)
*B01J 19/00* (2006.01)
*C02F 1/46* (2006.01)
*C02F 1/78* (2006.01)
*B01F 23/233* (2022.01)
*B01F 25/312* (2022.01)
*B01F 27/91* (2022.01)
*B01F 101/00* (2022.01)

(52) U.S. Cl.
CPC .... *B01F 23/2331* (2022.01); *B01F 25/31242* (2022.01); *B01F 27/91* (2022.01); *B01J 19/0066* (2013.01); *C02F 1/4608* (2013.01); *C02F 1/78* (2013.01); *B01D 2253/106* (2013.01); *B01D 2253/116* (2013.01); *B01D 2257/80* (2013.01); *B01D 2259/40098* (2013.01); *B01F 23/23311* (2022.01); *B01F 23/23314* (2022.01); *B01F 2101/305* (2022.01); *B01J 2219/083* (2013.01); *B01J 2219/0869* (2013.01); *B01J 2219/0871* (2013.01); *B01J 2219/0875* (2013.01); *B01J 2219/0896* (2013.01); *C02F 2305/023* (2013.01)

(58) Field of Classification Search
CPC ........ B01J 2219/0875; B01J 2219/0896; B01J 7/00; B01J 2219/085; B01J 2219/0809; B01J 2219/083; B01J 2219/0841; B01J 2219/0813; B01J 2219/0892; B01J 2219/00006; B01D 53/06; B01D 53/261; B01D 53/28; B01D 2253/106; B01D 2253/116; B01D 2257/80; B01D 2259/40098; B01F 3/04539; B01F 5/0428; B01F 7/22; B01F 2003/04546; B01F 2003/04567; B01F 2215/0052; C02F 1/4608; C02F 1/78; C02F 2305/023; C02F 2303/04; C01B 13/10; C01B 13/11; C01B 13/13; C01B 13/00; C01B 3/00; C01B 2201/00–90; B03C 3/017; B03C 3/019; B03C 2201/14; Y10S 422/906; Y10S 422/907; H01J 37/32568; H01J 37/32541; H01J 37/32449; H01J 37/32036; H01J 37/32458; H01J 37/24; A61L 2/14; A61L 2/20; A61L 2/26; F02B 43/10; H01M 8/0606; H01M 8/04089; H01M 8/0662; Y02T 10/30; Y02E 60/50; Y02P 70/50

See application file for complete search history.

(56) References Cited

U.S. PATENT DOCUMENTS

| | | |
|---|---|---|
| 2005/0115946 A1 | 6/2005 | Shim et al. |
| 2011/0006463 A1 | 1/2011 | Layman |
| 2015/0179411 A1 | 6/2015 | Laux et al. |
| 2018/0195520 A1 | 7/2018 | Oh et al. |

FOREIGN PATENT DOCUMENTS

| | | |
|---|---|---|
| EP | 2108846 A2 | 10/2009 |
| JP | 597405 A | 4/1993 |
| JP | H7-289621 A | 11/1995 |
| JP | H9-285795 A | 11/1997 |
| JP | H10-139404 A | 5/1998 |
| RU | 189145 U1 | 6/2018 |
| WO | 2009/111582 A2 | 9/2009 |

OTHER PUBLICATIONS

International Search Report and Written Opinion dated Nov. 2, 2018 for International Application No. PCT/US2018/049331 filed Sep. 4, 2018.

Japanese Office Action for Japanese Application No. 2020-512504, dated Apr. 12, 2022.

* cited by examiner

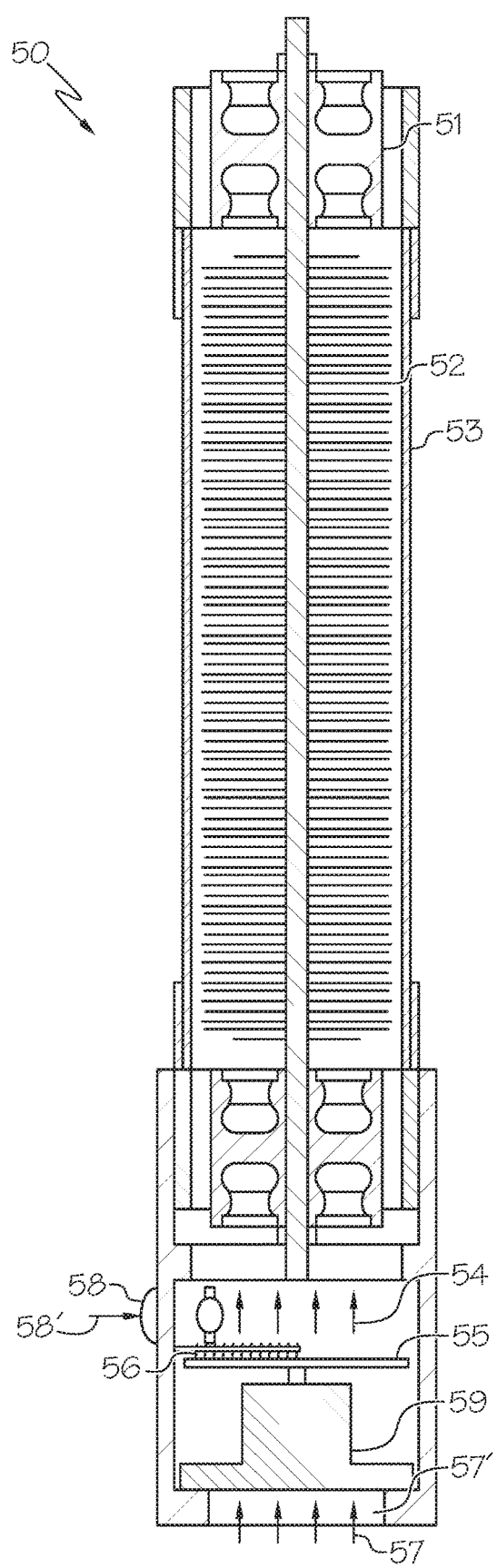
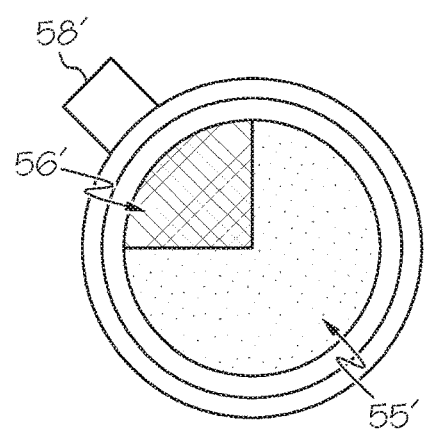
FIG. 5B
FIG. 5A

FREE RADICAL GENERATOR AND METHODS OF USE

CROSS REFERENCE TO RELATED APPLICATIONS

This application depends from and claims priority to U.S. Provisional Application 62/553,546 filed Sep. 1, 2017, the entire contents of which are incorporated herein by reference.

TECHNICAL FIELD

The present disclosure relates to devices and methods for advanced generation of free radicals that may be used as reactants in various processes.

BACKGROUND

Advanced oxidation processes (AOPs) utilize the powerful hydroxyl radical (OH*) as a major oxidizing agent. The OH* radical is nonselective in its behavior and rapidly reacts with numerous species. The reaction of OH* with organic compounds produces carbon-centered radicals (R* or R*—OH). With $O_2$, these carbon-center radicals may be transformed to organic peroxyl radicals (ROO*). Because hydroxyl radicals have a very short lifetime, they are produced in-situ through different methods, including a combination of oxidizing agents (such as $H_2O_2$ and $O_3$), and/or irradiation (such as ultraviolet light or cold plasma) of water, or catalysts (such as titanium dioxide).

It is well known that Ozone ($O_3$) is a strong oxidant. Direct $O_3$ oxidation is a selective reaction in which $O_3$ preferentially reacts with the ionized and dissociated form of organic compounds, rather than the neutral form, although under certain conditions, OH* is produced from $O_3$ to initiate the indiscriminate oxidation. Different mechanisms have been proposed to describe the generation of OH* as below:

$$3O_3 + H_2O \rightarrow 2OH^* + 4O_2 \quad (1)$$

In the presence of other oxidants or irradiation, the OH* yield can be significantly improved. For example, in the peroxone ($O_3/H_2O_2$) system, the $O_3$ decomposition and OH* production are enhanced by hydroperoxide ($HO_2^-$) produced from $H_2O_2$ decomposition.

$$H_2O_2 \rightarrow HO_2^- + H^+ \quad (2)$$

$$HO_2^- + O_3 \rightarrow OH^* + O_2^- + O_2 \quad (3)$$

Further, with $O_3$/ultraviolet (UV) irradiation, $H_2O_2$ is generated as an additional oxidant primarily through $O_3$ photolysis.

$$O_3 + H_2O + h\nu \rightarrow H_2O_2 + O_2 \quad (4)$$

$$H_2O_2 + h\nu \rightarrow 2OH^* \quad (5)$$

Efficient generation of OH* radicals with a high density and reliability via streamer discharge to achieve practical AOP is desirable. However, prior systems and methods for achieving this are lacking and necessitate further improvement. Hence, new methods and devices are provided for effective AOP.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

It is desirable that a discharge device be capable of utilizing feed gases (e.g., air) with high moisture content (for useful OH* radicals) to generate copious OH* radicals at the high efficiency required for the advanced oxidation process (AOP). However, in the presence of suspended water droplets in the feed gas (e.g., air), the discharge device may malfunction causing unwanted arcing, especially when the feed gas velocity at the discharge tips falls below certain threshold value (e.g., 2 m/sec). Alternatively, when water itself is used as a counter electrode, surface undulations and discharge gap variation can lead to inhomogeneous AOP treatment and device malfunction.

Described herein are methods and devices that may solve one or more of these problems. In at least one aspect, a device and method for removing water droplets from a feed gas is described. This may increase the concentration and the efficiency of OH* radical generation. The device and method may use a feed gas with high dissolved moisture content while maintaining the conditions (pressure and temperature) so that droplet formation is prevented in a discharge gap. The device further includes a steam generator as well as a gas heater enabling high dissolved moisture content in the feed gas.

In yet another aspect, a method for removing moisture from the feed gas to selectively generate ozone is provided. This may include a regenerative desiccant wheel in a flow of the feed gas that continuously supplies dry air to the discharge gap and thereby primarily produces ozone.

In yet another aspect, a device and method for the continuous supply of OH* radicals and ozone gas is described. Such a method may be used, for example, to remove organic and inorganic pollutants. This may include either a discharge device that generates both OH* radicals and ozone at a desired ratio or at least two discharge devices, one primarily providing OH* radicals and the other primarily providing ozone to enable the advanced oxidation process.

In yet another aspect, methods for directing free radicals from a discharge devices to an application site and distributing them to react with organic and inorganic pollutants are provided. This may include a method for creating a suction through the discharge device and mixing the radical gas with a target fluid.

Accordingly, it becomes possible to solve the above aforementioned problems and to generate OH* radicals or $O_3$ or their combination (OH*/$O_3$) selectively, which can either be utilized in the discharge gap or supplied to an application site for advanced oxidation.

BRIEF DESCRIPTION OF THE DRAWINGS

The drawings are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Exemplary aspects will become more fully understood from the detailed description and the accompanying drawings, wherein:

FIG. 5A is a schematic illustration of a discharge device including a regenerative desiccant wheel for removing moisture from a feed gas to the discharge gap according to one or more embodiments shown and described herein;

FIG. 5B is a schematic illustration of a regenerative desiccant wheel according to one or more embodiments shown and described herein;

DETAILED DESCRIPTION

Figure 1:
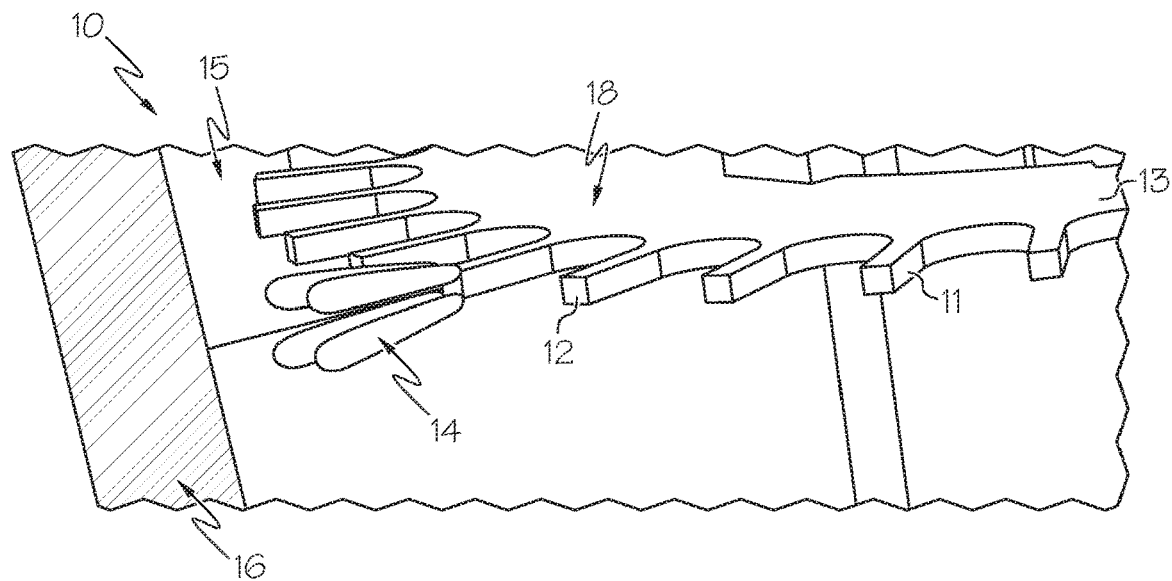
FIG. 1 is a schematic illustrating electrode tips with four streamer ignition points to generate four repelling streamers according to one or more embodiments shown and described herein.

Detailed aspects are disclosed herein; however, it is to be understood that the disclosed aspects are merely exemplary in nature and may be embodied in various and alternative forms. The figures are not necessarily to scale. Therefore, specific details disclosed herein are not to be interpreted as limiting, but merely as a representative basis for any aspect of the invention and/or as a representative basis for teaching one skilled in the art to variously employ the present invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Throughout this specification, where publications are referenced the disclosures of these publications in their entireties are hereby incorporated by reference into this application to more fully describe the state of the art to which this invention pertains.

The following terms or phrases used herein have the exemplary meanings listed below in connection with at least one aspect:

A "dielectric" material as used herein is a medium or material that transmits electrical force without conduction and as such has low electrical conductivity. An illustrative example of a dielectric material is glass.

"Discharge gap" as used herein means the gap between the active electrode and the ground electrode.

"FRG" as used herein means "Free Radical Generator" operating according to the teachings of this disclosure.

"Carbonaceous material" as used herein includes graphite, woven carbon or graphite fiber filled with binders, graphitized carbon materials, and compacted carbon materials, among others.

"Mist" as used herein includes a cloud of tiny droplets of a liquid suspended in a gas wherein droplet weight is lower than the drag force exerted by the gas.

"Fumigation" as used herein includes applying a gaseous fume of certain radicals to disinfect or to rid of biological organisms or toxins.

"Superbugs" as used herein includes a strain of bacteria that has become resistant to one or more antibiotic drugs.

"Toxins" as used herein includes an antigenic poison or venom of plant or animal origin, optionally one produced by or derived from microorganisms and causing disease when present at low concentration in the body.

"Streamer" means a self-sustained ionization wave having substantial field enhancement in the range of 100-250 $kV.cm^{-1}$ compared to the applied voltage which is in the range of 20-30 $kV.cm^{-1}$ and propagating in neutral gas which is converted into low-temperature plasma behind the wave front, resulting in a channel like appearance. The interior of the streamer channel consists of a conducting plasma with roughly the same electron and ion densities.

"Free radical" means an atom or group of atoms that has an unpaired electron and is therefore unstable and highly reactive as those terms are recognized in the art.

"Field" means the electric field, which can be positive or negative in nature. Similar fields repel each other and opposite fields attract each other.

As a way of background, when multiple streamers are generated from streamer ignition points in close proximity, their own electrical fields would influence the characteristics of each other. Streamers originating from same polarity electrodes diverge away from each other in the absence of any restrictive fields around them. If constrained uniformly from all sides by the fields of neighboring streamers, radius thinning as well as field enhancement would occur, thereby enhancing the product of the electron energy and the probability density distribution, and hence the free radical generation efficiency. The proximity field influence and its resulting streamer tip field enhancement depends on several factors such as the gap and distribution of the ignition points, the distance from the counter electrode, the discharge gas as well as the applied voltage.

FIG. 1 illustrates an optional embodiment of a discharge device 10 including a discharge electrode 18 according to the teachings provided in this disclosure. The discharge electrode 18 comprises one or more pins 11 each comprising a square tip 12. The one or more pins 11 may be arranged along and extend outwardly from the circumference of a disc 13. Each disc 13 can be formed by a laser beam or electron beam or stamped for mass manufacturing, such that the discharge electrode 18 can be assembled en masse. Aligned with the teachings of the disclosure, the square tip 12 may generate four streamers 14 when brought within sufficient proximity of a counter electrode 16 and a suitable voltage is applied across a discharge gap 15 between the discharge electrode 18 and the counter electrode 16. For illustration purposes only, the discharge device 10 shows a single disc 13 and four streamers 14 emerging from one of the square tips 12 towards the counter electrode 16. In other embodiments, many discs similar to the disc 13 may be assembled together and each of the one or more pins 11 may generate identical streamers to achieve field proximity constraints. In some embodiments, each of the discs 13 may be substantially identical. In some embodiments, the one or more pins 11 may be positioned such that the distance between the streamers 14 is uniform and the streamers 14 are uniformly distributed on the circumference of the discharge electrode 18.

Figure 2:
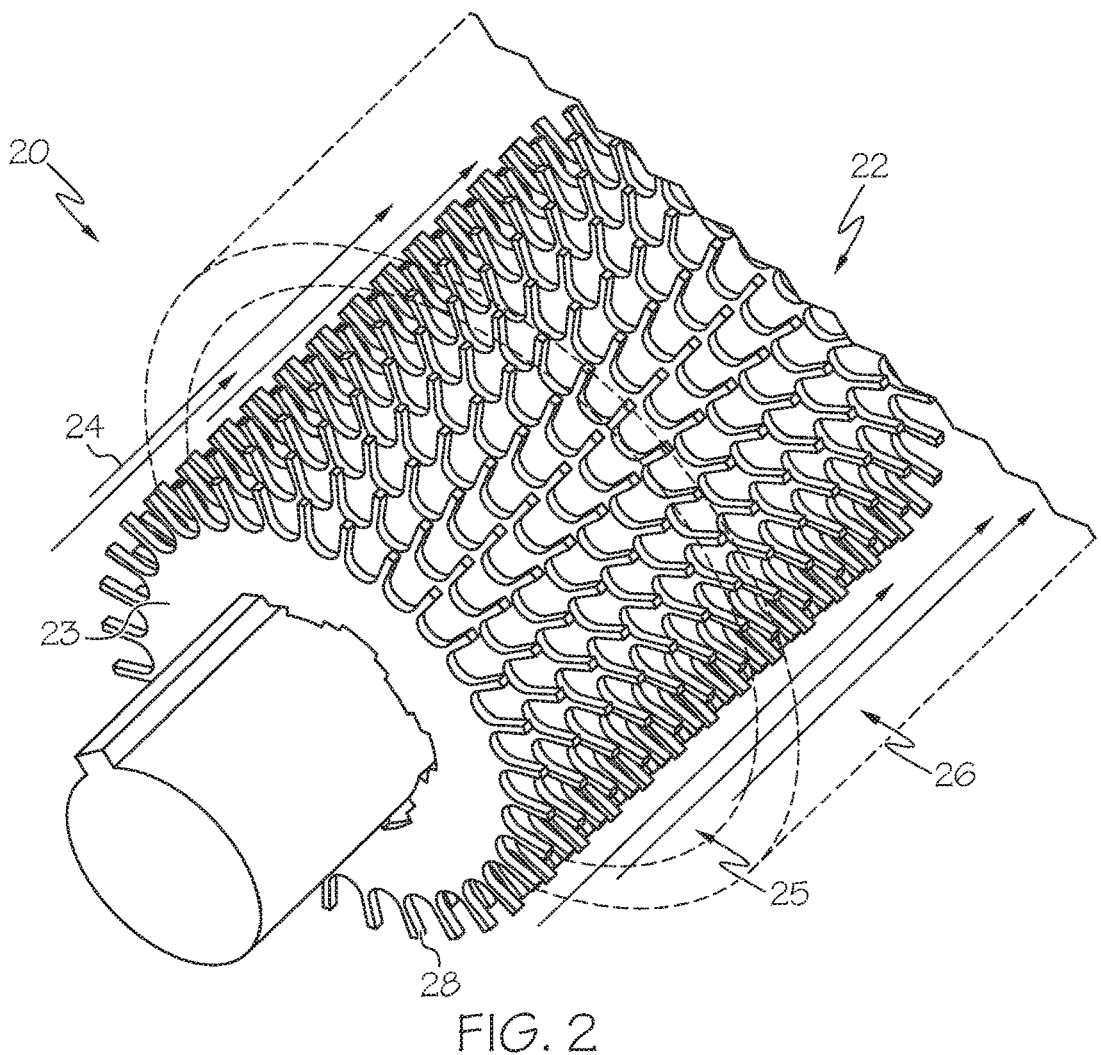
FIG. 2 is a perspective view of an assembled discharge electrode inside a ground electrode according to one or more embodiments shown and described herein.

FIG. 2 shows a discharge device 20 that has a discharge electrode 22 similar to the discharge electrode 18 of FIG. 1. The discharge electrode 22 is disposed inside a cylindrical counter electrode 26 and the spacing between adjacent one of the one or more square tips 12 is equal both in the radial direction as well as in the axial direction. This may ensure uniform interaction of the feed gas 24 (e.g., air) with the streamers 14 as the feed gas passes through the discharge gap 25. When an appropriate voltage is applied, a multitude of self-constrained streamers emerge from the discharge electrode 22 and propagate towards the counter electrode 26 presenting a uniform ionization front which generates free radicals in the feed gas 24 as discussed above. For reference, dissociation and ionization of $H_2O$ can be achieved with electron energies in the order of 5 eV, whereas ionization of oxygen requires electron energies in the order of 7 eV. The streamer head may be an effective radical generator. A pulsed electrical voltage may be applied to the discharge electrode 22 and the pulse width may depend on several factors including the discharge gap. In one relationship that describes particular characteristics of the discharge device 10, the time required for the streamer to cross the discharge gap 15 is Ts. Tp may be equal the full width at half maximum (FWHM) of the electrical pulse applied to the discharge electrode 18 and a ratio R=Ts/Tp may describe a relationship between the two. When R=1, the electrical pulse ends at the moment the streamers 14 reach the counter electrode 16. Other ratios are contemplated.

It will be appreciated that when the streamers 14 traverse across the discharge gap both electrons and ions will accumulate in the discharge gap. The conductivity of the discharge gap plays an important role on the application of successive voltage pulses for successive streamer generation. Therefore, the gas flow rate in the discharge gap plays an important role. The higher the gas flow rate the more effective the removal of ions from the discharge gap, which reduce the potential for arcing across the discharge gap. However, higher gas flow rates reduce the concentration of radicals in the feed gas (e.g., the number of radicals per unit volume of gas). On the other hand low gas flow rates result in higher radical concentration, but may increase the potential of arcing due to insufficient removal of ions between successive pulses. In some embodiments, a discharge device may have the ability to run at different gas flow rates to enable generation of radicals at a desired concentration.

Additionally, in some embodiments, the tips of the one or more pins may have a different geometry. The ability to modify a projection of the streamer by manipulating the repulsive fields of surrounding streamers by changing the shape of the tip of the one or more pins enables changing the shape of the field without changing the magnitude of the voltage applied to the electrode assembly. This may enable modification of the probability energy density distribution function of electrons to selective mean energy levels. In some embodiments, the shape of the tip and/or the magnitude of the applied voltage is changed to adjust the mean of the probability energy density distribution to the vicinity of 5 eV to generate OH* radicals. In some embodiments, the shape of the tip and/or the magnitude of the applied voltage is changed to adjust the means of the probability energy distribution to the vicinity of 7 eV or higher to generate O* radicals. It may not be possible to avoid the production of O* in a gas mixture completely. In a dry gas O* radicals may be selectively generated to produce ozone. Generally, larger discharge gaps may tend to produce more OH* radicals, all other factors being equal (requires relatively low voltage ~5 eV or less). A smaller discharge gap may tend toward the production of O* radicals, all other factors being equal (requires relatively high voltage ~7 eV or more). Other non-limiting parameters (e.g., discharge tip geometry and inter pin distance) may be tailored to achieve similar outcomes for a given discharge gap and magnitude of applied voltage. While the embodiments described herein include pins with a square tip, it is to be understood that the tips may have any shape, non-limiting examples including a circular tip, a triangular tip, etc.

As noted above the presence of humidity in the feed gas as well as the probability energy density distribution function may affect the type of radicals generated by a discharge device. If the mean of the probability energy density distribution function is around 5 eV, there still will be a significant number of electrons with energies higher than 7 eV and they can potentially ionize oxygen. However, if there are abundant water molecules in the feed gas, high energy electrons may preferentially ionize $H_2O$ resulting in OH*. In reality, the dissociation process is complex when multiple species are present. For example, the O* and OH* radicals may react rapidly with other molecules to form secondary radicals such as $HO_2$ or $O_3$. Additionally, there may be other constituents in feed gas that react with the streamers in the discharge gap. For example, ethylene ($C_2H_4$) has a dissociation energy in the same range of water (~4.5 eV). If present in the feed gas (for example in a produce storage environment), ethylene may dissociate along with $H_2O$ forming complex compounds.

Figure 3:
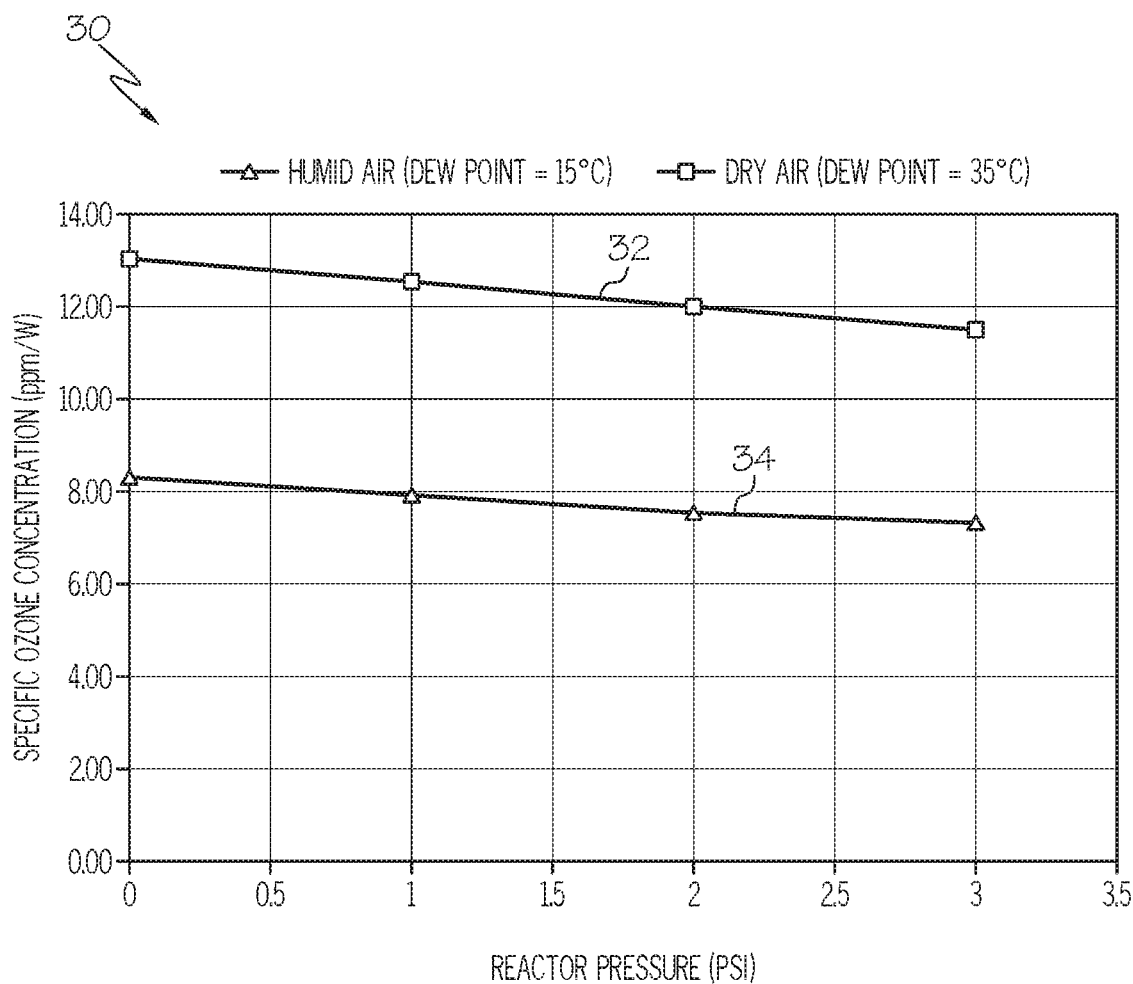
FIG. 3 presents the change in specific output ozone concentration with respect to discharge gap pressure and moisture level in a discharge device according to one or more embodiments shown and described herein.
Figure 4:
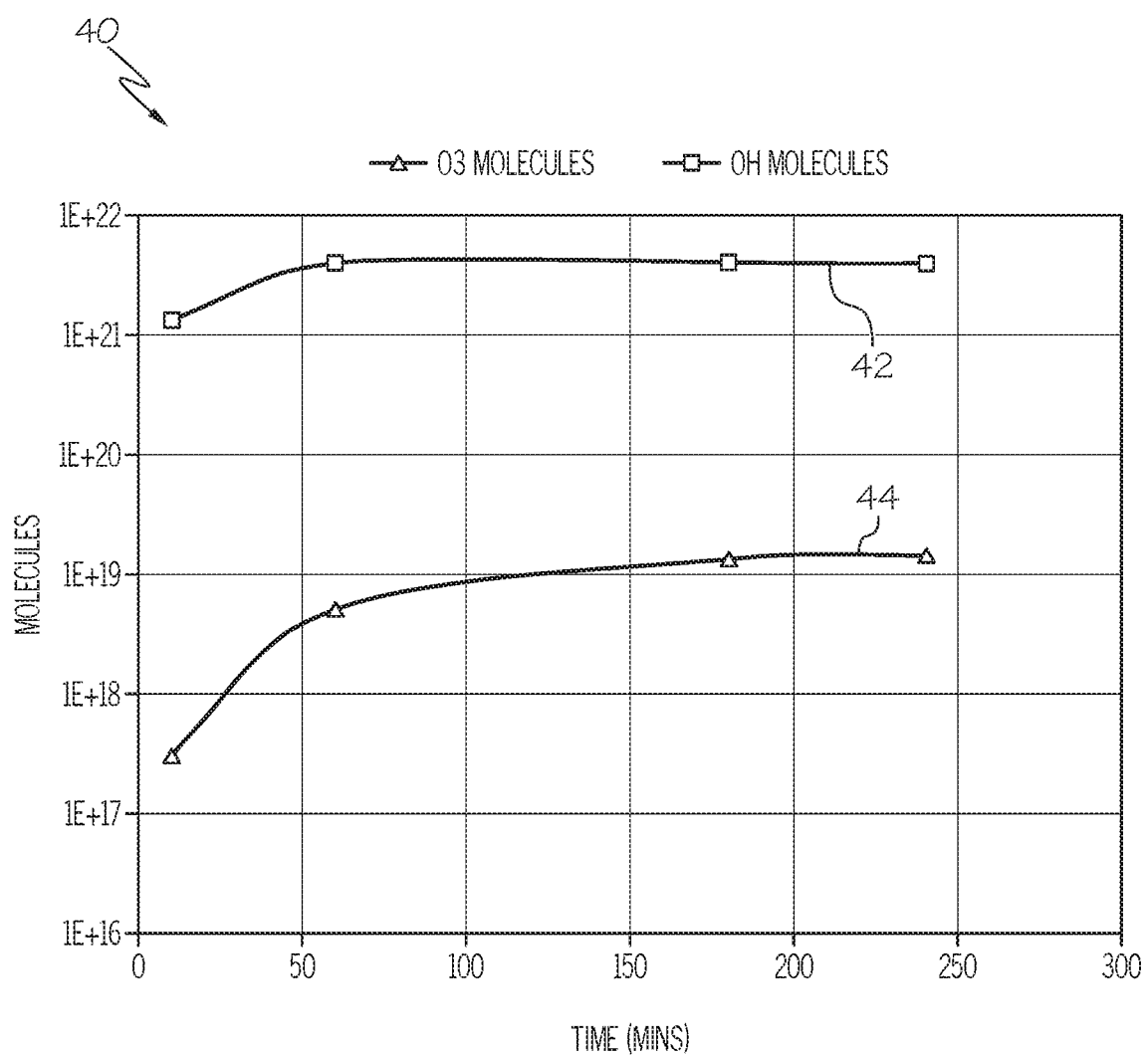
FIG. 4 presents the relative output concentration of ozone and OH* molecules with humid feed gas to a discharge device according to one or more embodiments shown and described herein.

As shown in FIG. 3, the ozone production 32 may be significantly higher in dry air as compared to the ozone production 34 in moist air. More specifically, FIG. 3 charts the specific ozone concentration of two discharge devices, one having a dew point temperature of 15 degrees Celsius, the other having a dew point temperature of 35 degrees Celsius versus the reactor pressure inside the discharge device (i.e., the pressure inside the discharge gap). It can be seen that the ozone production rate decreases with increasing reactor pressure. Higher reactor pressure increases streamer ignition voltage and hence decreases the ionization rate. Additionally, the molecular concentration ozone 42 and OH* 44 molecules in humid air (99% relative humidity) is shown in FIG. 4. As seen, a considerable amount of OH* radicals is generated along with ozone molecules in humid air. Additionally, if contaminations such as $CO_2$, $SO_2$, or NO are present in the feed gas, O*, OH*, $HO_2$* and $O_2$* may react with radicals produced from these molecules or directly with the molecules themselves, leading to other byproducts.

As the moisture content in the feed gas increases, more and more energy is utilized in generating OH* radicals. At a given temperature and pressure, there is a limit on how much moisture can be fed to the discharge gap without precipitating water droplets. For example, at one atmospheric pressure and 25° C., only 20 g of water can be added to 1 kg of air (20 g/kg) without precipitating water droplets. As such, the relative humidity at standard temperature and pressure is optionally above 95% (18.97 g/kg), optionally at or above 96% (19.17 g/kg), optionally at or above 97% (19.37 g/kg), optionally at or above 98% (19.56 g/kg), optionally at or above 99% (19.76 g/kg), optionally at or above 99.5% (19.86 g/kg), optionally at or above 99.9% (19.94 g/kg), optionally at or above 99.99% (19.96 g/kg) where amounts are grams water per kilograms air. Optionally, the amount of water per kg air does not exceed 20 g/kg, optionally does not exceed 19.76 g/kg. The forgoing numbers are measured at standard temperature and pressure and may vary at different temperatures and pressures, but the degree of saturation will be constant relative to the above. In some embodiments, feed gas that is saturated with moisture beyond a saturation point of the feed gas (or, in other words, feeding a mist to the discharge gap) may be injected into the discharge gap of a discharge device.

Depending on the polarity of voltage applied across the discharge gap to generate a discharge (i.e., positive or negative), an energy level of the discharge, and the chemical composition of the feed gas inside the discharge gap and of the surrounding environment (e.g., in both gas and liquid phases), various types of chemical reactions can be initiated and a number of primary and secondary species can be formed by the streamers in the feed gas and at the gas-liquid (e.g., water) interface. In some embodiments, radicals may dissolve into the liquid droplet and provide various chemical and biocidal characteristics to the mist. Among various chemical species produced by the streamer at the oxygen gas-liquid (e.g., water) environment, OH* radical, atomic oxygen, ozone and hydrogen peroxide are the main reactive oxygen species (ROS) generally accepted to play the dominant role in the chemical and bio-inactivation process, and the discharge device can be utilized to provide advanced oxidation treatment as will be discussed below.

However, feeding a two phase fluid or in other words air with suspended water droplets may introduce several practical difficulties to efficiently operate the discharge device. For example, the suspended water droplets accumulate charge on their surface while traveling through the discharge gap and get attracted to the counter electrode. Accumulation of liquid at the electrodes may lead to arcing and may hinder reliable and continuous operation of the discharge device. As mentioned above, the primary and secondary radical species that dissolve into the water droplets cannot be utilized if they condense on the electrodes. It has been observed that gas velocity in excess of 5 m/s at the discharge tip can prevent droplet precipitation in 100% humidity air. Higher velocities may be used to prevent droplet precipitation in saturated air with suspended droplets. However, the overall concentration of radicals may also reduce inversely to an increase in the rate of airflow lending the device unsuitable for applications that require high radical concentrations. The gas velocity at the discharge tip for saturated air is optionally between 5 m/s and 100 m/s. Furthermore, as indicated above the ideal conditions (dissociation voltage and discharge gap etc.) for OH* radical generation are different from that of oxygen and hence ozone production. Therefore, coproduction of OH* radicals and ozone with the same discharge device is not optimal. Alternatively, the discharge device for ozone production should primarily run with dry air and the discharge device for OH* radical generation should deploy air with high moisture content but without suspended water droplets.

Now, referring to FIGS. 5A-5B, an exemplary discharge device 50 is disclosed. In some embodiments, the discharge device 50 may utilize a feed gas with a relatively low moisture content, but embodiments are not limited thereto. It is contemplated that the discharge device 50 may also utilize a feed gas with a relatively high moisture content or a feed gas with a moisture content that is between a relatively high and a relatively low moisture content. The discharge device 50 may include a regenerative desiccant wheel 55 for removing moisture from the feed gas, to remove moisture from the feed gas before it enters a discharge gap between a discharge electrode 52 and a counter electrode 53. The feed gas 54 is represented by arrows. In FIG. 5A, the feed gas 54 may be relatively dry because it has passed through the regenerative desiccant wheel 55. The details of the discharge electrode 52 and counter electrode 53 are provided herein. The regenerative desiccant wheel 55, may be rotated continuously by a motor 59. The inlet air 57 passes through an inlet 57' and a pass through section 55' of the desiccant wheel that is larger than a regenerative section 56', which may include a heater 56 for heating recovery air 58' illustrated by an arrow in FIG. 5A. Moisture from the inlet air 57 (i.e., the feed gas) is removed by the regenerative desiccant wheel 55. The heater 56 may be disposed on the opposite side of the regenerative desiccant wheel 55 as compared to the inlet 57'. Recover air 58' may be provided to the heater 56 through the recovery air inlet 58. The recovery air 58' removes moisture from the regenerative desiccant wheel 55. The regenerative section 56', including the heater 56, may have a smaller surface area as compared to the area of the pass through section 55'. The area ratio between regenerative section 56', including the heater 56, to the pass through section 55' for dehumidification may vary between 1/9 and 1/2, optionally a ratio is between 1/4 and 1/3.

There may be many ways to fabricate the regenerative desiccant wheel 55. Non-limiting examples include, a packed bed of moisture absorbing material such as silica gel, or constructing the regenerative desiccant wheel 55 from a crystalline structure with pores of molecular dimensions that permit the passage of molecules below a certain size (e.g., molecular sieves), or coating the moisture absorbing material onto a woven scaffold. Coating the moisture absorbing material onto a woven scaffold allows high air flow rates. The rotation speed of the regenerative desiccant wheel 55, air flow, thickness of the regenerative desiccant wheel 55 and the temperature of the heater 56 may be adjusted individually or in some combination to achieve the desired level of moisture in the feed gas. The dew point of the feed gas may optionally vary between −60° C. to 25° C., and optionally a range is between −4° C. to 4° C.

Figure 6:
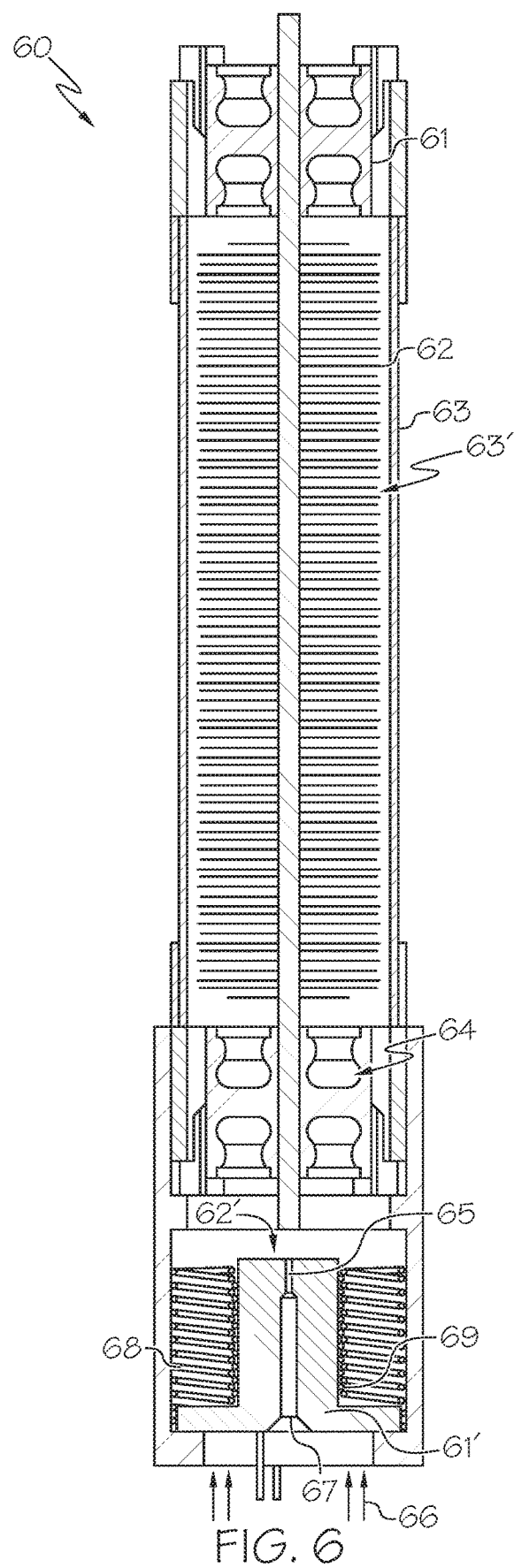
FIG. 6 is a schematic illustration of a device for adding dissolved moisture to a feed gas optionally for generating OH* radicals according to one or more embodiments shown and described herein.

FIG. 6 illustrates an exemplary discharge device 60. In some embodiments, the discharge device 60 may operate at a relatively high dissolved moisture content. In other embodiments, the discharge device 60 may operate at a relatively low moisture content or between a relatively low moisture content and a relatively high moisture content. As discussed above suspended water droplets in a feed gas within a discharge gap may result in arcing and device malfunction when a voltage is applied across the discharge gap. However, having a relatively high moisture content in the feed gas may be necessary to generate a high concentration of OH* radicals. In other words, the feed gas may have moisture content 0.01 g/kg or higher below the saturation point, which is a function of the temperature of the feed gas as well as the pressure inside the discharge device. It is well known that as temperature increases the amount of water required to saturate a specific volume of air also increases. For example, at one atmospheric pressure, the specific humidity for saturation is 10 g(w)/Kg(air) at 15° C., whereas it increases to 49.8 g(w)/Kg(air) at 40° C. The discharge device 60 of FIG. 6 may include a nozzle assembly 61' that includes a steam nozzle 65. The steam nozzle 65 may be disposed at an inlet air channel 62' of the discharge device 60 and the steam nozzle 65 may be operably connected with a water inlet 67. Heating coil 69 may heat the nozzle assembly 61' ensuring generation of superheated steam (T>100° C.) which is ejected to the inlet air channel 62' of the discharge device 60 and carried into a discharge gap 63' by inlet air 66 which is preheated by heating coil 68. Preheating the inlet air 66 prior to steam injection ensures dissolution of the steam into dissolved moisture and inhibits precipitation of water droplets within the discharge gap 63'.

The amount of moisture intake will depend on the flow rate, air temperature and the steam temperature. The water feed rate may optionally vary between 1 g/hour and 1 kg/hour, optionally the feed rate may optionally vary between 100 g/hour to 500 g/hour. The air flow may optionally vary between 1 m$^3$/hour and 200 m$^3$/hour, optionally the air flow may vary between 20 m$^3$/hour and 100 m$^3$/hour. The steam temperature may optionally vary between 100° C. and 1000° C., optionally the steam temperature may optionally vary between 200° C. and 500° C. Physiochemical events involving reactions (1) through (5) may optionally occur inside the discharge device providing OH* radicals which can be used for many practical applications. The discharge gas carrying various radicals may optionally precipitate water droplets forming a wet fume as it emerges from the reactor exit 61. When applied, this wet fume may attach to surfaces and provide biocidal disinfection including a breakdown of biofilms. Due to boundary layer phenomenon, dry gases such as ozone may not penetrate through biofilms which may provide fertile ground for pathogen proliferation and contamination.

As discussed above, advanced oxidation of organic and some inorganic pollutants can effectively be achieved through in-situ generation OH* radicals. Different mechanisms for in-situ generation of OH* radicals were described by Eq. (1) through Eq. (5) which either involve ozonation of water, or $H_2O_2$ dissociation or a combination thereof known as peroxone ($O_3/H_2O_2$) system. The critical requirement for advanced oxidation process however, is in situ generation of OH* radical due to its short life span. According to the teachings of this disclosure, the ability to selectively generate large amount of OH* radicals as well as ozone through the discharge device lends to advanced oxidation applications, independent of a $H_2O_2$ supply chain. In other words, both ozone and OH* radicals can be generated by supplying oxygen and moisture into the discharge device.

Figure 7:
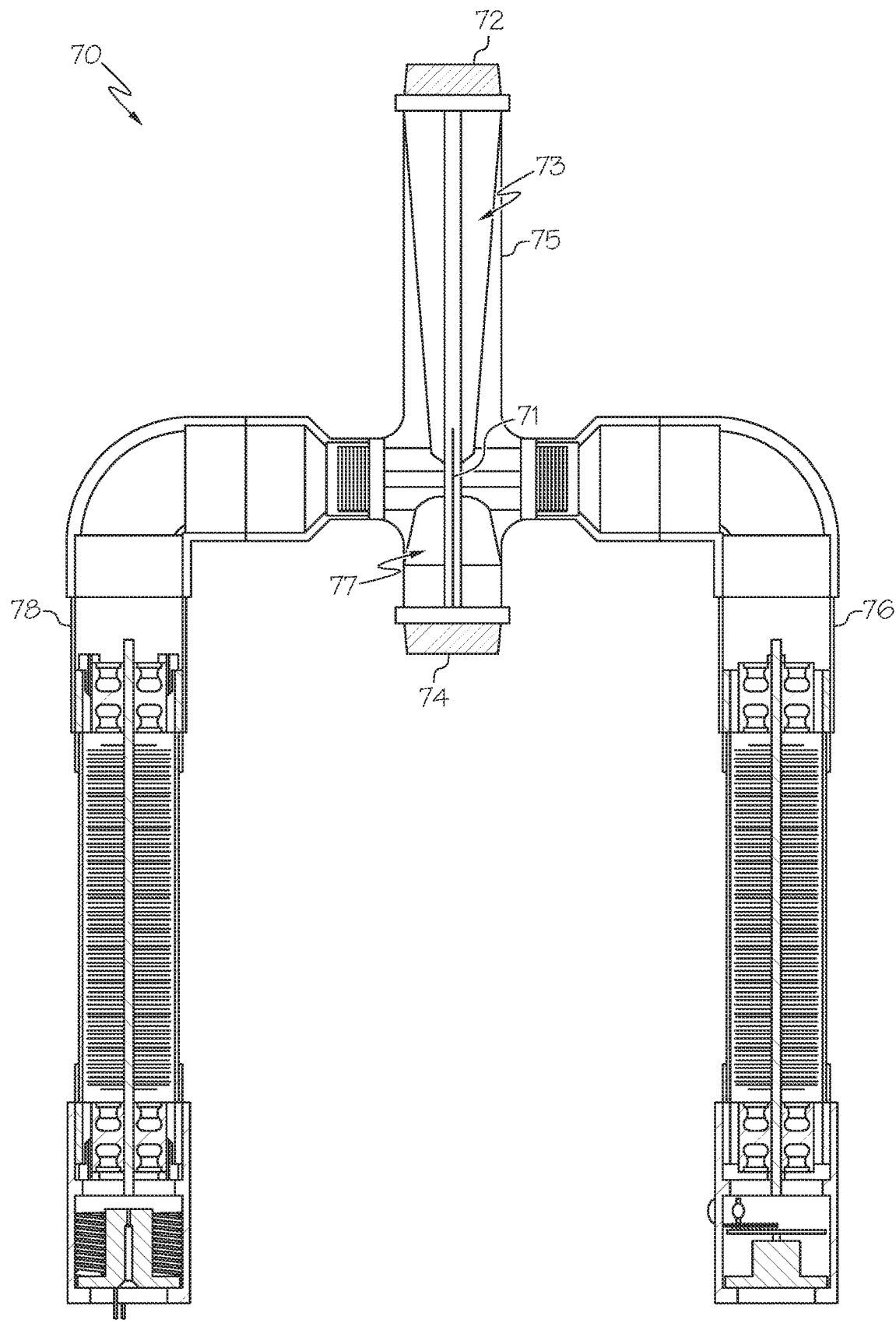
FIG. 7 is a schematic illustration of a mixing nozzle simultaneously drawing OH* radicals and ozone from respective generators through suction ports and mixing them with a fluid passing through a convergent-divergent nozzle assembly according to one or more embodiments shown and described herein.

Now referring to FIG. 7, an advanced oxidation assembly 70 including a convergent-divergent nozzle assembly 75 is illustrated. The advanced oxidation assembly 70 includes a discharge device 76 operating in ozone generation mode and another discharge device 78 operating in OH* generation mode. The discharge device 76 and the discharge device 78 may be operably coupled at a throat 71 between a convergent section 77 and a divergent section 73 of the convergent-divergent nozzle assembly 75. When a fluid passes through the convergent-divergent nozzle assembly 75, it generates a suction drawing the ozone from the discharge device 76 as well as OH* from the discharge device 78 and mixes them with the fluid. The fluid optionally can be contaminated water or contaminated air or can be clean water and/or air which are directed towards disinfecting another object. The convergent-divergent nozzle assembly 75 mixes the OH* radicals/ozone with the fluid passing through the convergent-divergent nozzle assembly (i.e., from an inlet 74 to an outlet 72). The oxidation reaction may proceed beyond the mixing zone of the flow system and an optional contact chamber (not shown) may be provided to store the mixed fluid to complete the reactions. It is to be understood that the ratio of gas volume supplied through the discharge devices to the flow volume of main fluid through the convergent-divergent nozzle assembly 75 impacts the mixing efficiency. Specifically, the lower the ratio, the greater the suction that is created leading to more efficient mixing. When the main fluid is water, with relatively little air flow through the first and second discharge devices, micro bubbles may form resulting in more efficient mixing. The air to water volume ratio is optionally between 0.05 and 0.5. Although, the convergent-divergent nozzle assembly 75 is very simple from operation stand point, it limits the air intake into the discharge device for a given volume of main fluid flow. In other words, the recommended intake air flow may not provide the best operation condition for the discharge device.

Figure 8:
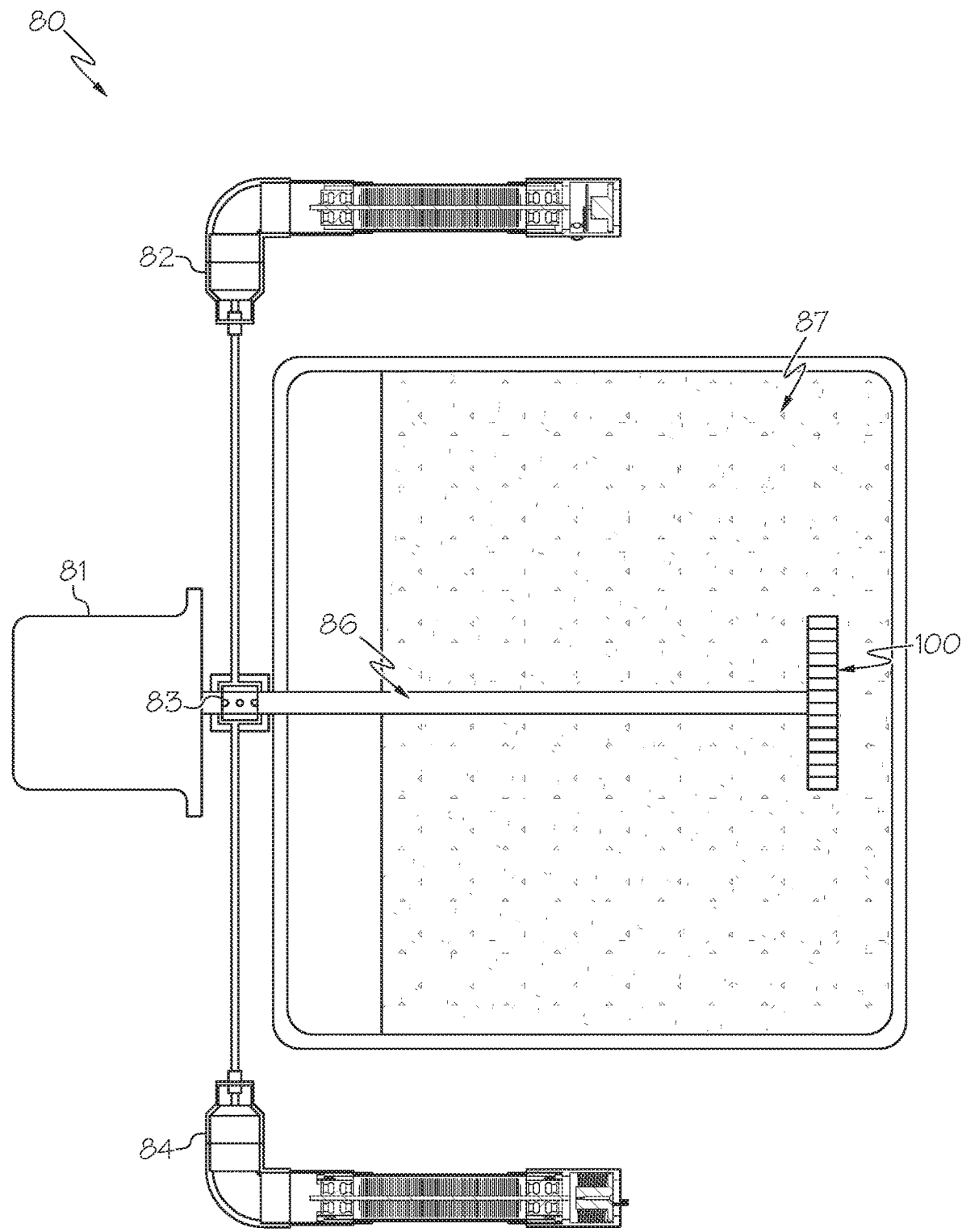
FIG. 8 is a schematic illustration of a turbine mixing system simultaneously drawing OH* radicals and ozone from respective generators through suction ports and mixing them with a fluid according to one or more embodiments shown and described herein.
Figure 9:
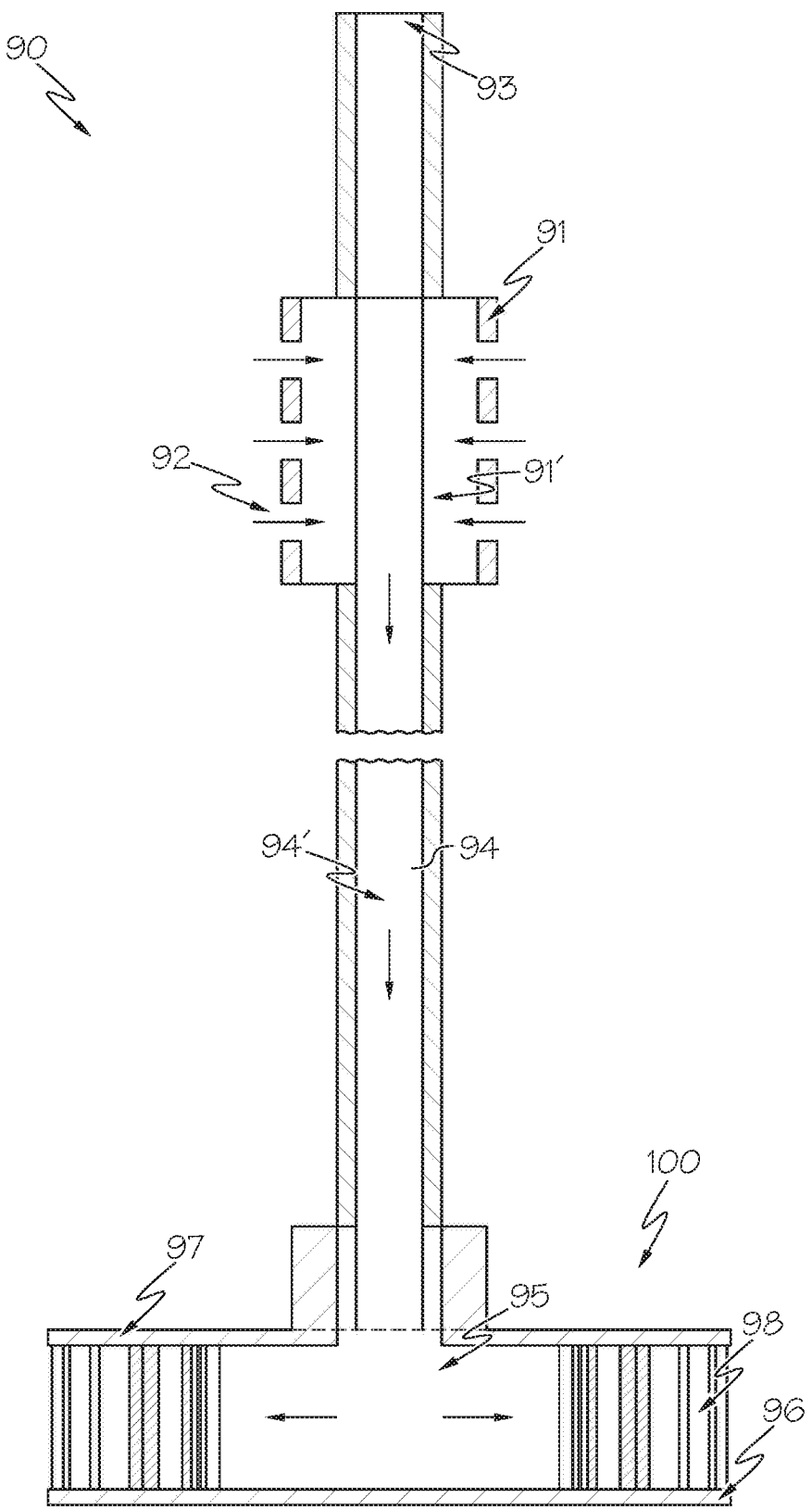
FIG. 9 is a schematic illustration of a turbine mixing system according to one or more embodiments shown and described herein.
Figure 10:
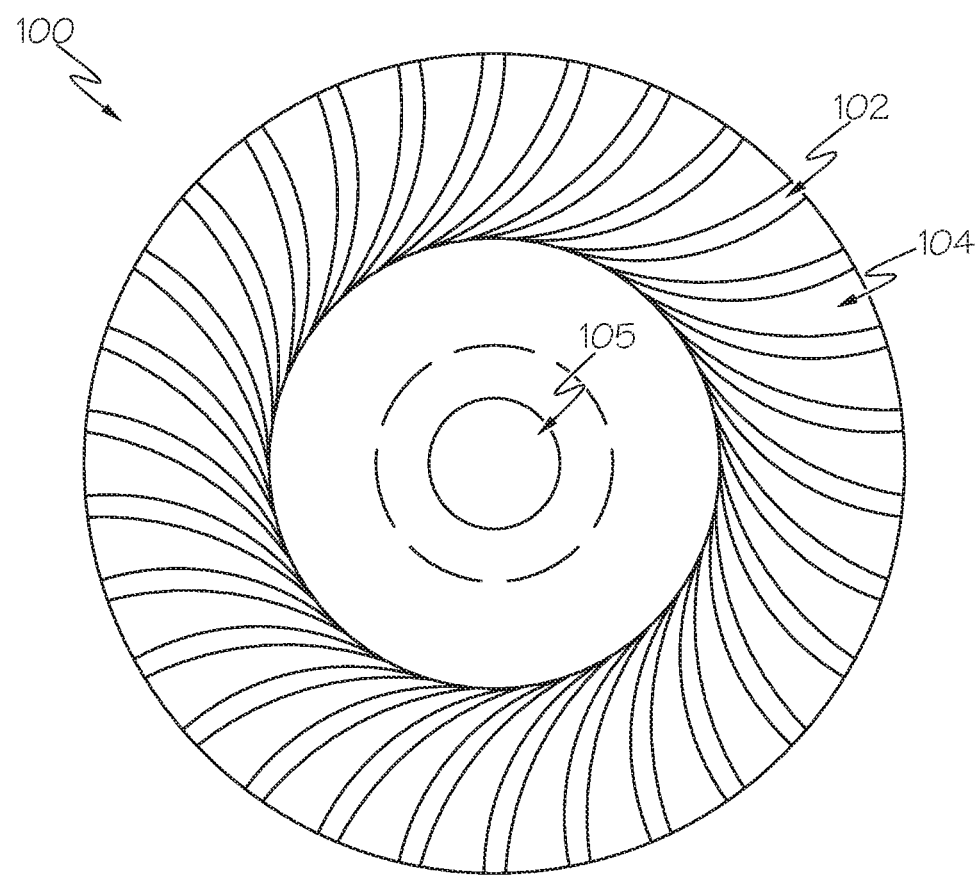
FIG. 10 is a schematic illustration of the blades of the turbine of FIG. 9 according to one or more embodiments shown and described herein.
Figure 11:
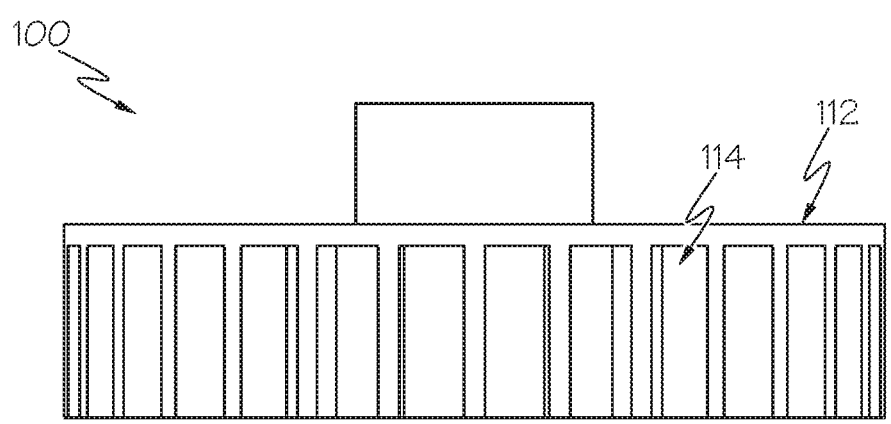
FIG. 11 is a schematic side view of the turbine of FIG. 9 according to one or more embodiments shown and described herein.
Figure 12B:
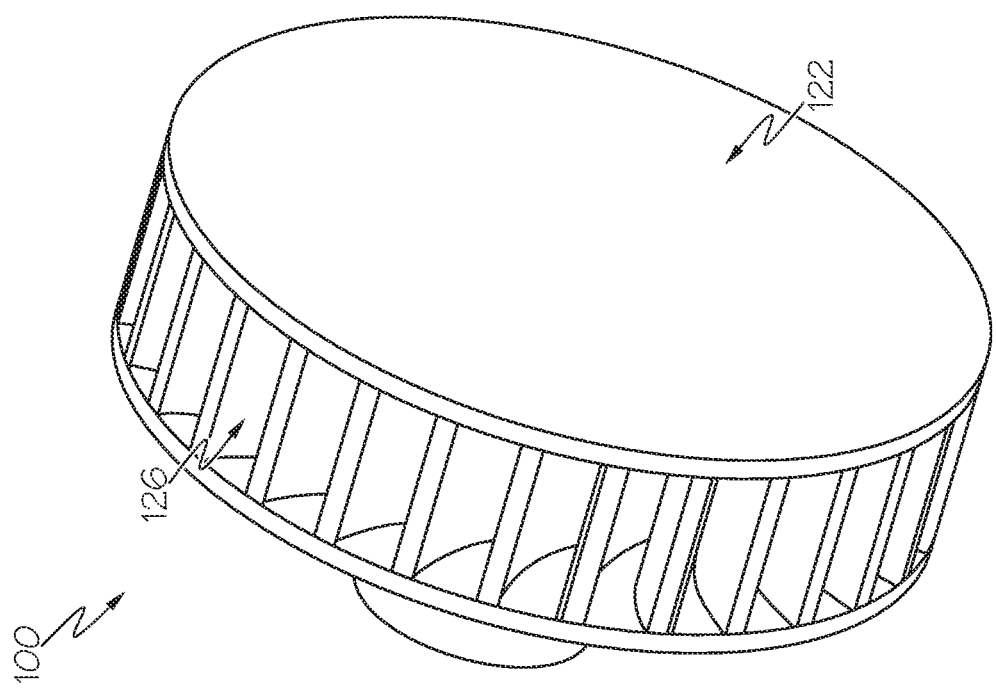
FIG. 12B is a second perspective view of the turbine of FIG. 11 according to one or more embodiments shown and described herein.
Figure 12A:
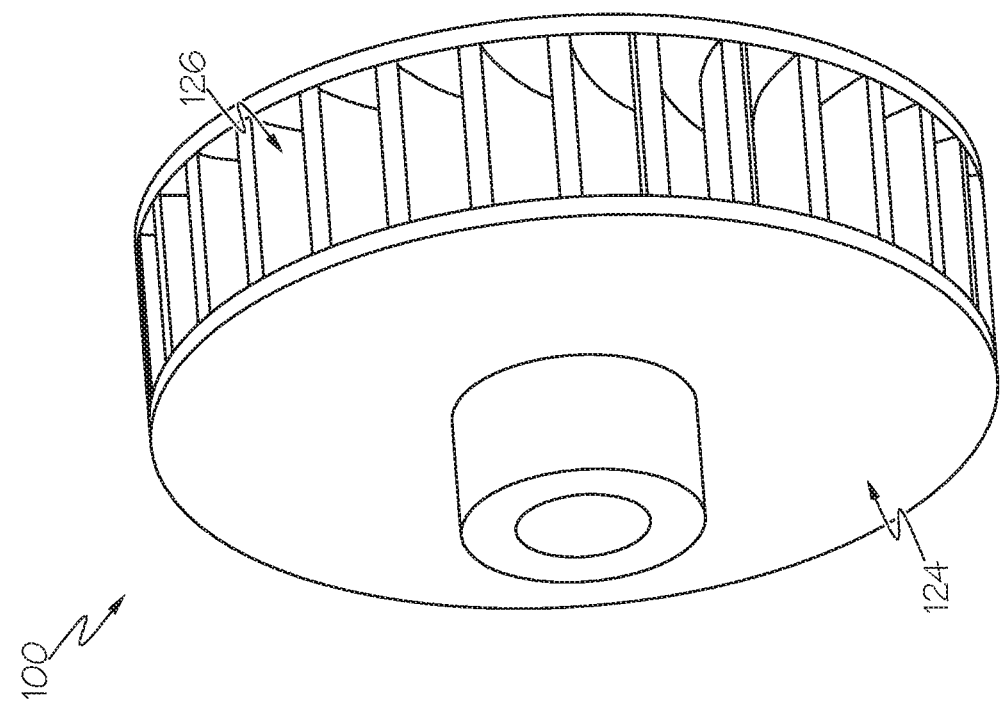
FIG. 12A is a first perspective view of the turbine of FIG. 11 according to one or more embodiments shown and described herein.

Now referring to FIG. 8, a mixing system 80 that may mix free radicals with a liquid 87 is disclosed. The exemplary embodiment of the mixing system 80 may include a turbine 100 immersed in a liquid 87 that may be operably coupled with a motor 81 through a hollow shaft 86 and a coupling 83. The coupling 83 may provide fluid communication between the turbine 100 and the discharge devices 82 and 84, thereby enabling suction of radical laden gas into the turbine 100. Further details of the turbine 100 and associated systems are illustrated in FIG. 9. As shown in FIG. 9, a turbine system 90 may include a hollow shaft 94 that includes a shaft channel 94'. The shaft channel 94' may be fluidly coupled with a coupling channel 91'. The hollow shaft 94 may be closed at a closed end 93 and the shaft channel 94' may open to a suction chamber 95 of the turbine 100 at the other end. The suction chamber 95 may include a top cover 97 and a bottom cover 96 and may be operably in communication with the liquid through the side channels 98. Suction ports 92 may be provided through a shaft seal 91 which may establish fluid communication with the discharge devices 82 and 84 (FIG. 8). The internal blade arrangement for the turbine 100 is illustrated in FIG. 10. Each blade 102 may bend progressively toward a suction chamber 105 thus providing a progressively narrowing channel 104 between adjacent blades 102. A side view of the turbine 100 is shown in FIG. 11. Perspective views of the turbine are shown in FIGS. 12A-12B. When the turbine 100 rotates, a suction force is generated which draws radical gas and breaks it into micro bubbles and disperses them into the liquid. The fine bubbles enhance the mixing process significantly. The suction pressure depends on the size and rotation speed of the turbine 100 which is optionally set between 600-2000 rpm. The diameter of the turbine 100 is optionally kept between 2 inches and 50 inches. The suction pressure increases with increasing diameter and rpm which can be beneficially adjusted to draw a determined amount of radical containing fluid while forming micro bubbles to enhance mass transfer of the radicals.

Figure 13:
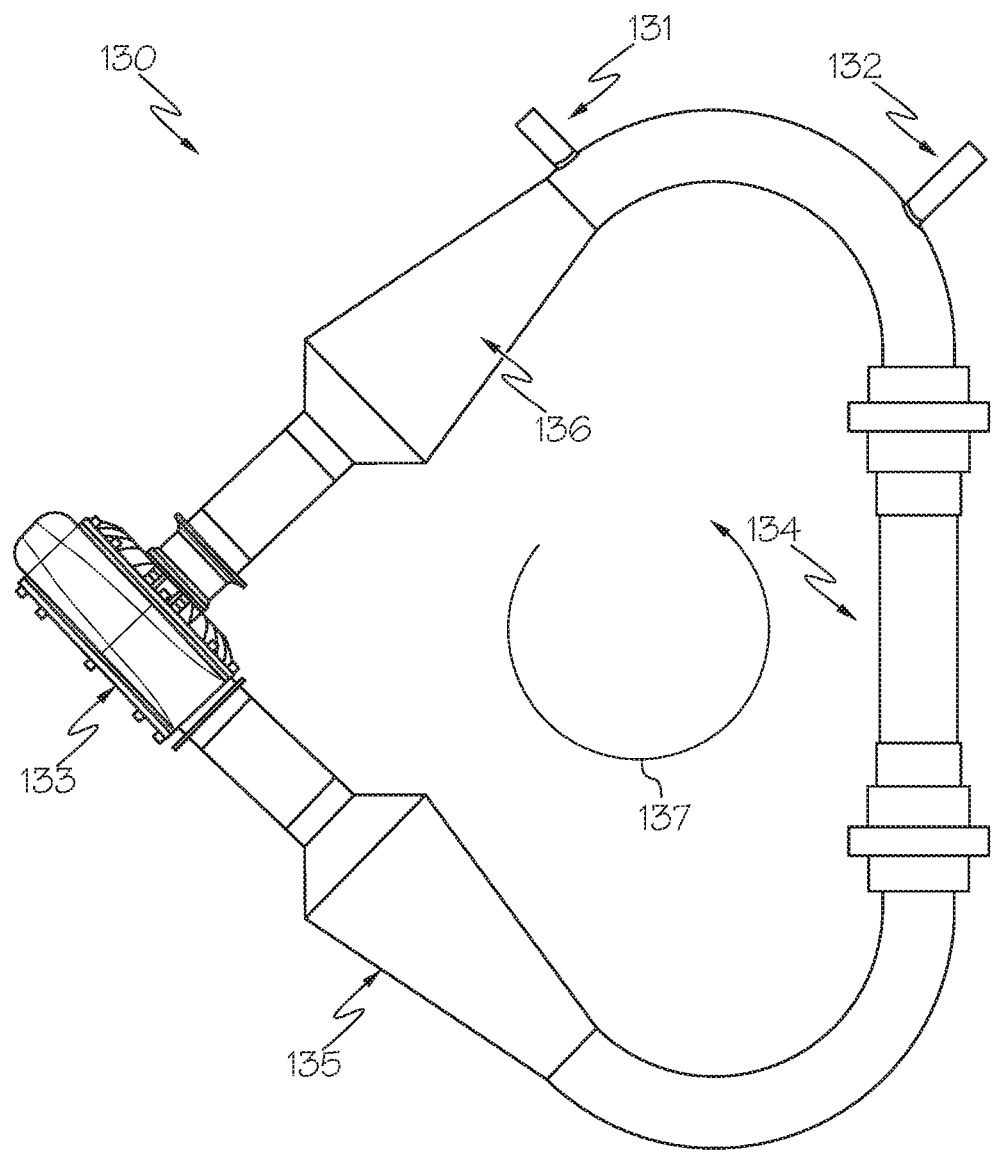
FIG. 13 is a schematic illustration of a recirculation system for providing a high flow rate through a discharge device while having low throughput discharge of a gas from a recirculation system according to one or more embodiments shown and described herein.

Now referring to FIG. 13, an exemplary recirculation system 130 for providing high gas flow as well as high radical concentration is provided. A discharge device 134 (such as the discharge device 10 of FIG. 1) may be operably coupled to the recirculation system 130. The recirculation system 130 may include a turbo fan 133 which may draw feed gas (e.g., air) from a diffuser 136 and feed the feed gas (e.g., air) into a condenser 135 imparting flow in the recirculation system 130. This recirculation system 130 may continuously recirculate the feed gas at relatively high flow rates through the discharge device 134, which may increase a radical concentration in the feed gas. At the desired concentration, the feed gas may be drawn through an outlet 132 and may be provided to a device such as the convergent-divergent nozzle assembly 75 or the turbine system 90 disclosed herein for application and utilization in an advanced oxidation process. To conserve the air mass inside the recirculation system, an equivalent amount of fresh air may be provided through an inlet 131. Thus the volumetric flow rates through the inlet and the outlet can be controlled at a desired level to maintain desired flow rates inside the recirculation system 130. This arrangement may be used in a venturi type mixing system with low gas flows and high radical concentrations.

Figure 14A:
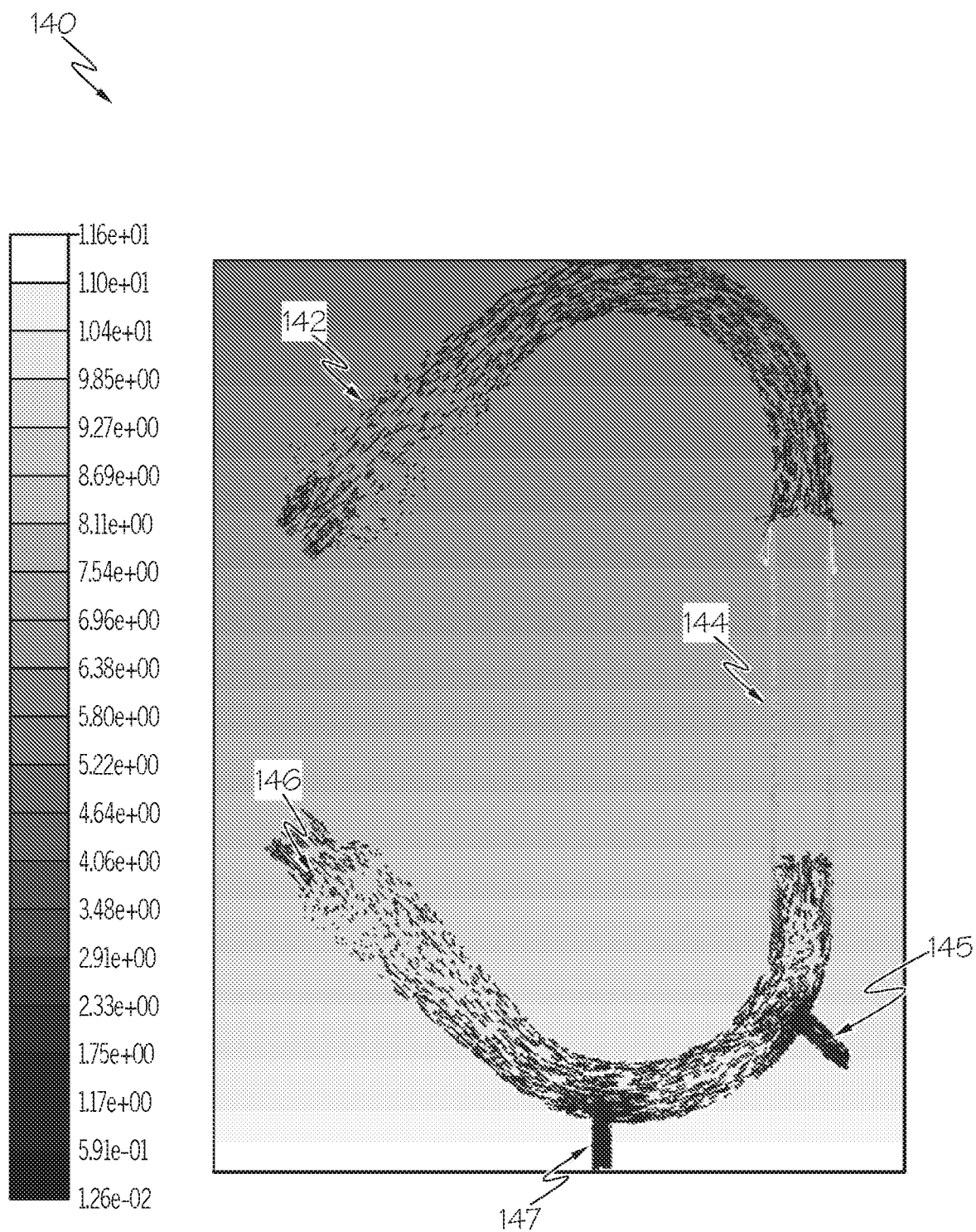
FIG. 14A presents a simulated flow field for the recirculation system of FIG. 13 demonstrating high flow rate through the discharge device while having low throughput discharge gas from the recirculation system according to one or more embodiments shown and described herein.
Figure 14B:
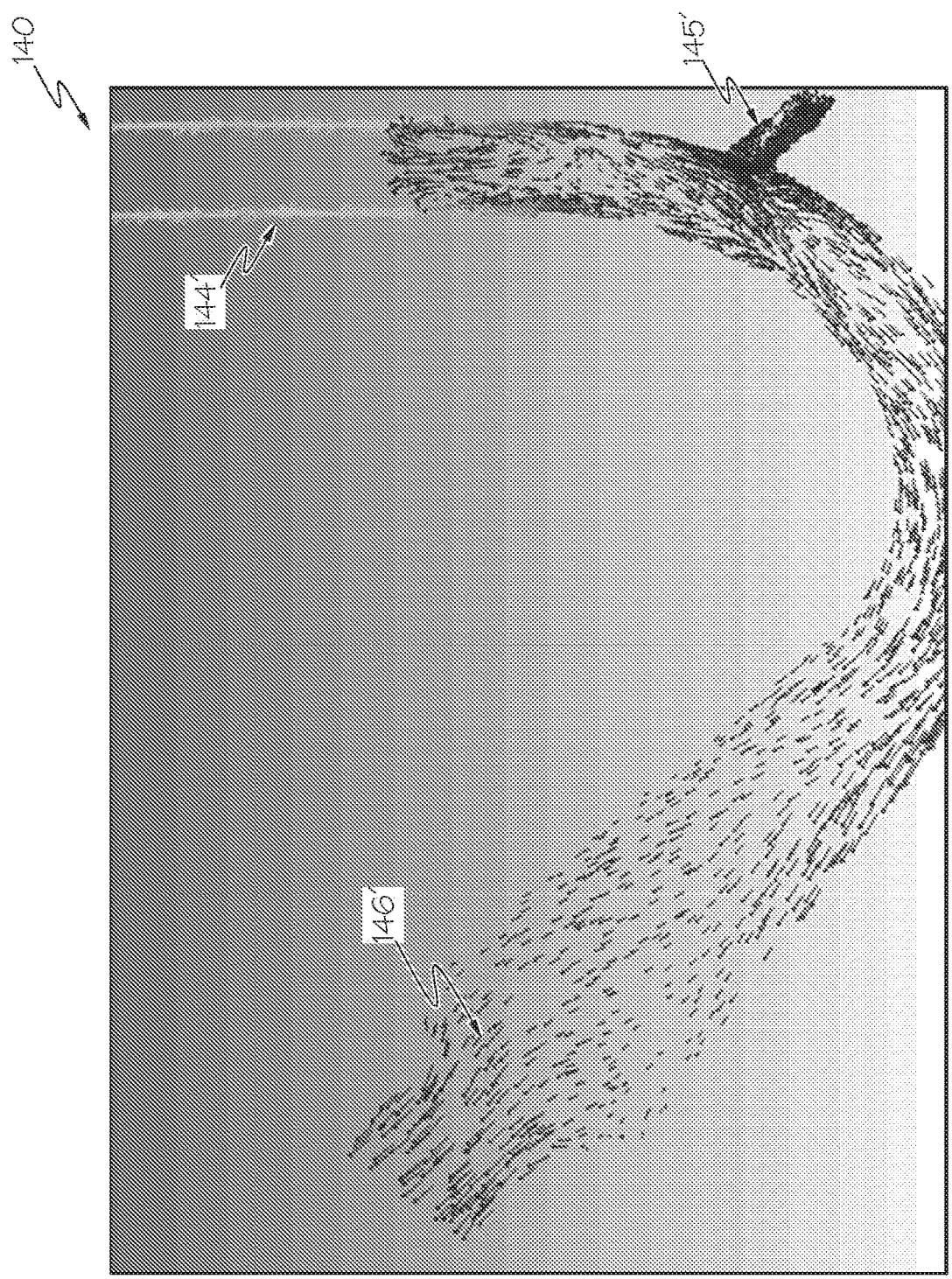
FIG. 14B presents a zoom view of the simulated flow field for the recirculation system of FIG. 14A demonstrating high flow rate through the discharge device while having low throughput discharge gas from the recirculation system according to one or more embodiments shown and described herein.

Flow simulations for an exemplary recirculation system such as the recirculation system 140 are presented in FIG. 14 illustrating flow through a condenser 142 moving fluid into a discharge device 144 where flow is able to continue to a diffuser 146. Similar to FIG. 13, fluid may be drawn as desired from an outlet 145 and added as desired through an inlet 147. In this example, the discharge device diameter was kept at 80 mm with a discharge gap of 4.5 mm. The inlet and outlet air volume was set at 2 m³/hour. As can be seen the gas flow velocity inside the discharge device is in the order of 10 m/s, whereas the net input and out from the system is at 2 m³/hour. Similarly, as illustrated in FIG. 14B which is a zoomed image of a section of FIG. 14A, fluid flow is illustrated through the device 140 includes near an outlet 145' proximal to a discharge device 144' and fluid flow may pass through a diffuser 146 upstream of a fan.

EXPERIMENTAL

1. Effect of Moisture

Figure 15:
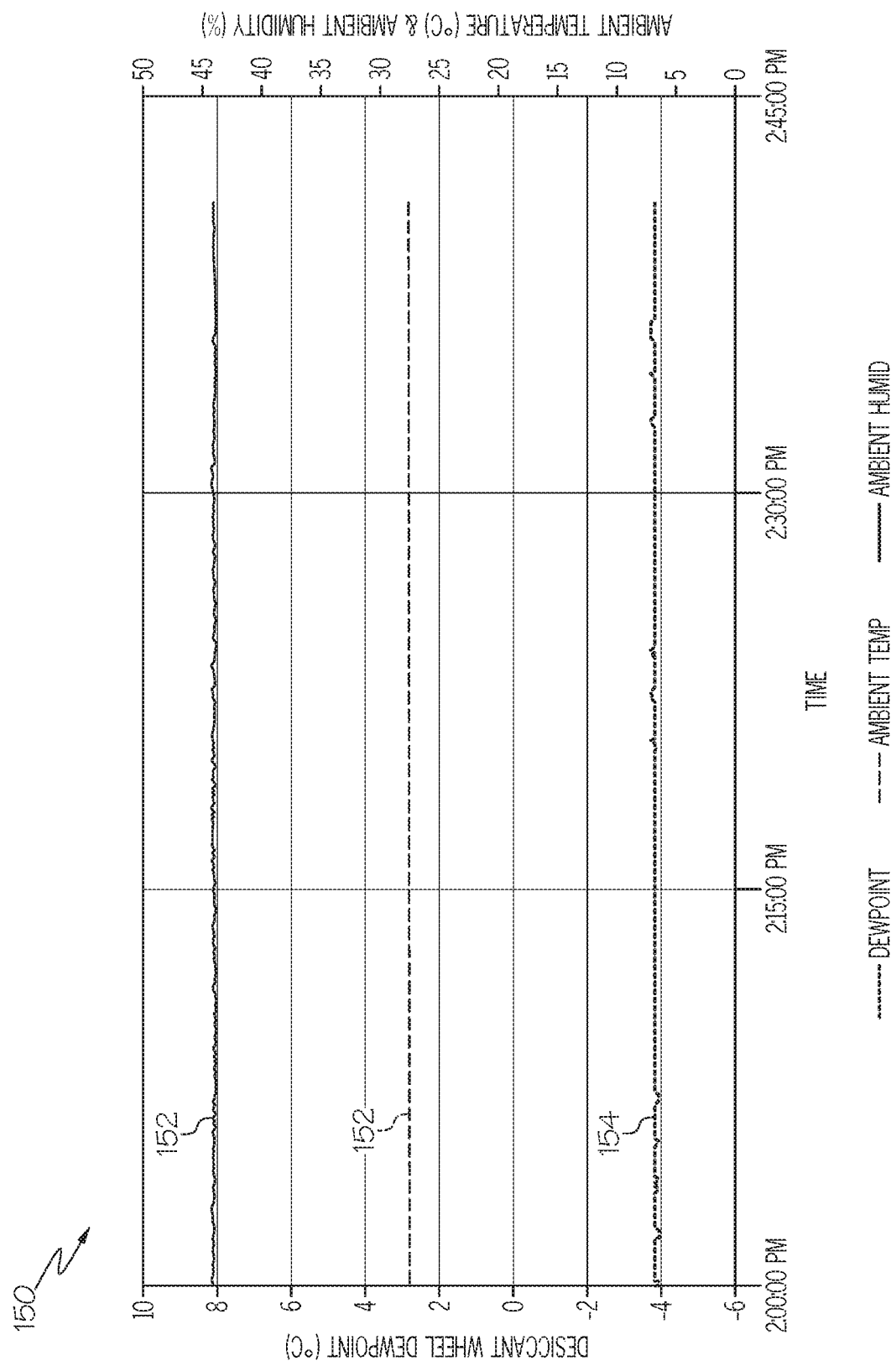
FIG. 15 presents the reduction in moisture content through a desiccator wheel of the recirculation system of FIG. 13 according to one or more embodiments shown and described herein.

It is believed that ozone forms via $O(^3P)+O_2+M \rightarrow O_3+M$ ($M=N_2$, $O_2$, $O_3$) and that the streamer dissociated high energy atomic oxygen $O(^1D)$ loses its excessive energy due to relaxation collision with gas molecules via $O(^1D)+M \rightarrow O(^3P)+M$. If dry gas is fed to the discharge gap, then OH* generation as by Eq. (1) through Eq. (5) will be suppressed leading to primarily $O_3$ formation. To study the effect of moisture content, a device was assembled according to the teachings illustrated in FIG. 5. The device parameters were kept as follows: 3875 discharge tips with square size=0.25× 0.25 mm², inter pin distance=2.5 mm and discharge tip to counter electrode distance=4.25 mm, arranged on a discharge electrode assembly having diameter of 30 mm and 430 mm height. The discharge electrode was connected to negative polarity with the following voltage parameters: $V_{applied}$=−9.5–10.5 kV, Pulse width=600 ns–1 µs, f=15 kHz. The discharge electrode was made from stainless steel and the ground electrode was made from graphite. A 12" diameter with 1" width regenerative desiccant wheel comprising of woven plastic coated with silica gel was utilized to remove the moisture from the feed gas. The regeneration to dehumidification area ratio was kept at 1/3. FIG. 15 presents exemplary performance data of the regenerative desiccant wheel for 3 m⁻³/hr feed gas flow rate with due point of 8° C., which is dried to a dew point of −4° C. continuously. Discharge experiments were conducted with two different air streams, one with a dew point of −35° C. and the other with a dew point of 15° C., respectively. An ozone monitor (Teledyne API 454 Process Ozone Analyzer) was employed to measure the ozone concentration at the exit and the specific energy consumption was calculated. As shown in FIG. 3, a significant drop in ozone production occurred with moist air.

2: OH* Radical Generation

This example demonstrates OH* radical production from the discharge device. A device was assembled according to the descriptions provided in FIG. 6. The device parameters were kept as follows: 4800 discharge tips, square size=0.25× 0.25 mm², with inter pin distance=2 mm and discharge tip to counter electrode distance=5 mm. The discharge electrodes were connected to negative polarity power supply with the following voltage parameters: $V_{applied}$=-9.5-10.5 kV, Pulse width=600 ns-1 μs, f=15 kHz, with an average power of 280 Wh. The discharge electrode was made from stainless steel and the ground electrode was made from graphite. Air with 99% relative humidity at a rate of 30 m$^3$/h was supplied to the discharge device. The device was placed in a 6.4 m$^3$ semi-airtight chamber and the ozone concentration was measured by an ozone monitor. From the volume of the chamber and ozone concentration, the number of moles of O$^3$ in the room was calculated. For the OH* concentration measurement, 4 samples of 2 mM disodium terephthalate were left in the test chamber. One sample was removed at each time interval and its fluorescence intensity was measured (fluorescence is seen if disodium terephthalate converts to 2-hydroxyterephthalic acid in the presence of OH*). Using standards for 2-hydroxyterephthalic acid, the concentration of OH* formed is calculated in mM. From this, the number of molecules of OH* is calculated. FIG. 4 presents the concentration of ozone and OH* molecules in the chamber with respect to time. As noticed these concentrations reach a plateau after the initial period indicating conversion of the radicals into some other forms. It is well known that OH* radicals are short lived and would combine with other species. At the end of the test, a de-humidifier was used to condense the moisture in the room. The condensate from the de-humidifier was used for peroxide measurement. The test kit showed 90 ppm of peroxide concentration in the 1800 ml of condensate collected. The observed $H_2O_2$ in the condensed moisture is a clear indicator of abundant OH* radical formation in the generator. It is possible that $H_2O_2$ may form inside the discharge gap, however, the dissociation energy for $H_2O_2$ is in the order of 2.21 eV and may dissociate to OH* as almost all the gas gaseous stream is directed to interact with the streamers until they exit the discharge gap according to the teachings of this invention.

To demonstrate the advanced oxidation capability of the radicals, three types of bacteria spore strips containing 1 million spores per strip were placed at different locations in the test chamber. The included bacteria spores were; *Bacillus atrophaeus, Bacillus pumilus* and *Geobacillus stearothermophilus*. The treatment time was set at 6 hours. It is to be noted that this time is not optimized. The observations and inferences are tabulated in Table 1 below. As can be seen, all the three bacteria spores were completely annihilated demonstrating the sterilization capability of the process that only utilizes water and electricity.

TABLE 1

| S No | Treatment Time (Hrs) | Mist Rate (g/hr) | Reactor Power | Organism | Organism Carrier | Kill Success |
|---|---|---|---|---|---|---|
| 1 | 6 | 500 | 300 | *Bacillus pumilus* | Spore strip - soft surface | Yes |
| 2 | 6 | 500 | 300 | *Geobacillus stearothermophilus* | Spore strip - soft surface | Yes |
| 3 | 6 | 500 | 300 | *Bacillus subtilis* | Spore strip - soft surface | Yes |

3: Mixing Methods

This example demonstrates the efficacy of a venturi type mixing system and a turbine type mixing system. To demonstrate the mixing efficacy of the systems, the discharge device described in example 1 was utilized, which primarily generated ozone. For the venturi type mixing system, two nozzles were used, one for flows up to 5 m$^3$/hr and the other for flows up to 10 m$^3$/hr. A Pentair Inteliflo variable speed pump (3 hp) was utilized to pump the water through the nozzle. The pump was set to deliver required flows through the nozzle and after ozone injection a residence time was provided in a 120 gallon contact tank with a degasser and destruct unit for undissolved ozone. After the residence tank, water flowed through pH (Coleparmer pH sensor and monitor), ORP (Coleparmer ORP sensor and monitor) and dissolved ozone sensors (Calibrated Emmerson dissolved ozone sensor and analyzer) to monitor the water quality. For the turbine mixer, a Baldor SuperE motor (5 hp) and an 8" turbine was deployed in a 300 gallon retention tank. Water from a reservoir was passed through the retention tank while the turbine mixed ozonated air drawn from the discharge device continuously. Then the water flowed through the same sensors described above.

The results from the mixing experiments are presented in Table 2. As noted, the mass transfer efficiency in the venturi type mixing system increased considerably (67%) with decreasing air water flow (0.85/9.99) while the mixing performance was 26% at higher air/water flow (1.42/3.3). On the other hand, at very high air/water flow (3.4/3.3), the turbine system demonstrated high mass transfer efficiency ~83%. As described herein, the discharge devices of this disclosure operate efficiently at high air flows and the turbine mixing system is appropriate for water treatment. Alternatively, the device illustrated in FIG. 13 can be utilized with the venturi type mixing system. Further, most industrial dielectric barrier type ozone generators utilize purified oxygen as the feed and hence have low flow. However, the generator of this disclosure utilizes air and for a given quantity of ozone, the volumetric flow rate may be substantially higher. Attention is drawn to the O$_3$ dosage in water (g/m$^3$). While low air flow in venturi system gives better mass transfer efficiency the overall dosage is low. For reference, there are recommended dosages for specific types of water treatment such as drinking water or recreational water etc. On the other hand, the turbine system can provide higher mass transfer efficiency at higher dosage.

TABLE 2

| Mixing method | Water Flow (m3/hr) | Air Flow (m3/hr) | Air O3 Conc (g/m3) | O3 Productivity (g/hr) | O3 Dosage in water (g/m3) | Mas Transfer Efficiency (%) |
|---|---|---|---|---|---|---|
| Venturi Injector | 3.3 | 1.42 | 4.5 | 6.39 | 1.936364 | 26 |
| | 9.57 | 1.89 | 5.4 | 10.206 | 1.066458 | 45 |
| | 10.15 | 1.98 | 2.5 | 4.95 | 0.487685 | 51 |
| | 9.99 | 0.85 | 7.7 | 6.545 | 0.655155 | 67 |
| Turbine Aerator | 3.3 | 3.4 | 2.4 | 8.16 | 2.472727 | 83.3 |
| | 3.3 | 1.7 | 4.5 | 7.65 | 2.318182 | 78.4 |
| | 5.4 | 3.4 | 2.4 | 8.16 | 1.511111 | 80.13 |
| | 5.4 | 1.7 | 4.5 | 7.65 | 1.416667 | 78.72 |

While aspects of the invention have been illustrated and described, it is not intended that these aspects illustrate and describe all possible embodiments of the invention. Rather, the words and illustrations used in the specification are words and illustrations of description rather than limitation, and it is understood that various changes may be made without departing from the spirit and scope of the invention.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

REFERENCE LIST
US PATENT DOCUMENTS

| 62/383,046 | September 2016 | Mohanty, P. |

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof.

The invention claimed is:

1. An advanced oxidation assembly for generating free radicals comprising:
    a first discharge device configured to be capable of generating free radicals;
    a second discharge device configured to be capable of generating free radicals; and
    a convergent-divergent nozzle assembly comprising a convergent nozzle that is fluidly coupled to a divergent nozzle at a throat, wherein
    a reactor exit of the first discharge device and a reactor exit of the second discharge device are fluidly coupled to the convergent-divergent nozzle assembly at the throat of the convergent- divergent nozzle assembly, and
    wherein the nozzle assembly is configured such that when fluid passes from the convergent nozzle to the divergent nozzle a suction pressure is created at the throat of the convergent-divergent nozzle assembly that draws fluid from the reactor exit of the first discharge device and the reactor exit of the second discharge device.

2. The advanced oxidation assembly of claim 1 wherein the first discharge device comprises:
    a reactor inlet;
    a discharge electrode assembly including one or more pins; and
    a counter electrode separated from the discharge electrode assembly by a discharge gap, wherein
    a voltage is applied across the discharge gap.

3. The advanced oxidation assembly of claim 1 wherein the first discharge device and the second discharge device are configured to produce ozone or a hydroxyl radical, optionally the first discharge device is configured to produce ozone and the second discharge device is configured to produce a hydroxyl radical.

4. The advanced oxidation assembly of claim 1, wherein the second discharge device comprises:
    a reactor inlet;
    a discharge electrode assembly including one or more pins; and
    a counter electrode separated from the discharge electrode assembly by a discharge gap, wherein
    a voltage is applied across the discharge gap.

5. The advanced oxidation assembly of claim 4, wherein:
    the first discharge device comprises a first discharge electrode assembly including one or more pins, wherein
    the one or more pins of the first discharge electrode assembly and the one or more pins of the second discharge electrode assembly of the second discharge device each independently extend outwardly from one or more discs and each of the one or more pins end in a tip with 4 points, wherein the tip generates four streamers when the voltage is applied across the discharge gap.

6. The advanced oxidation assembly of claim 4, wherein the first discharge device further comprises a humidity controlling device, the humidity controlling device comprising:
    a heating element;
    a regenerative desiccant wheel rotatively coupled to a motor by a shaft;
    an air inlet; and
    a recovery air inlet, wherein
    air passes through the air inlet, through the regenerative desiccant wheel, and into the discharge gap of the first discharge device;
    the heating element heats recovery air that enters through the recovery air inlet and the recovery air removes moisture from the regenerative desiccant wheel, and
    the motor turns the regenerative desiccant wheel at an adjustable speed to control an amount of moisture in the air that enters discharge gap.

7. The advanced oxidation assembly of claim 6, wherein the heating element is disposed between the regenerative desiccant wheel and the discharge gap or
    wherein the heating element is disposed on an opposite side of the regenerative desiccant wheel as the air inlet.

8. The advanced oxidation assembly of claim 6, wherein one or more of air flow through the air inlet and the recovery air inlet, a thickness of the regenerative desiccant wheel, and a temperature of the heating element are adjustable to control a level of moisture in the air that passes through the recovery air inlet and the air inlet to the discharge gap.

9. The advanced oxidation assembly of claim 6, wherein a dew point of the air entering the discharge gap is between −60 and 25 degrees Celsius or between −4 and 4 degrees Celsius.

10. The advanced oxidation assembly of claim 6, wherein the heating element covers a heated portion of the regenerative desiccant wheel and a surface area of heated portion of the regenerative desiccant wheel is smaller in relation to a surface area of the regenerative desiccant wheel.

11. The advanced oxidation assembly of claim 10, wherein a ratio of the surface area of the heated portion to the surface area of the regenerative desiccant wheel is between 1:9 and 1:2.

12. The advanced oxidation assembly of claim 4, wherein the second discharge device further comprises a humidity controlling device, the humidity controlling device comprising:
    a nozzle assembly comprising a water inlet that is fluidly coupled to a steam nozzle, and a nozzle heating coil;
    an air inlet assembly comprising an air inlet and an air heating coil inside an air inlet channel, wherein
    air passes through the air inlet and is heated by the air heating coil,
    water is injected into the water inlet and the water is heated in the nozzle, which is heated by the nozzle heating coil, steam is ejected from the steam nozzle to the air inlet channel forming a steam-air mixture in the air inlet channel, and the air causes the steam-air mixture to enter the discharge gap through the reactor inlet.

13. The advanced oxidation assembly of claim 12, wherein the steam injected into the air inlet channel from the steam nozzle is superheated steam.

14. The advanced oxidation assembly of claim 4, configured such that the fluid that flows through the first discharge device and the second discharge device is air and the fluid that enters the convergent nozzle of the convergent-divergent nozzle assembly is water.

15. The advanced oxidation assembly of claim 14, wherein a flow rate of air through the first discharge device is controlled based on a ratio between a volumetric flow rate of air through the first discharge device and a volumetric flow rate of water through the convergent-divergent nozzle assembly.

16. The advanced oxidation assembly of claim 15, wherein the ratio between the volumetric flow rate of air through the first discharge device and the volumetric flow rate of water through the convergent-divergent nozzle assembly is between 1:20 and 1:2.

* * * * *